(12) United States Patent
Shintani et al.

(10) Patent No.: US 7,891,806 B2
(45) Date of Patent: Feb. 22, 2011

(54) EYEGLASSES

(75) Inventors: Mitsuhiro Shintani, Higashiosaka (JP); Koichiro Oka, Higashiosaka (JP)

(73) Assignee: Yamamoto Kogaku Co., Ltd., Osaka (JP)

(*) Notice: Subject to any disclaimer, the term of this patent is extended or adjusted under 35 U.S.C. 154(b) by 0 days.

(21) Appl. No.: 12/462,740

(22) Filed: Aug. 7, 2009

(65) Prior Publication Data

US 2010/0060847 A1 Mar. 11, 2010

(30) Foreign Application Priority Data

Aug. 8, 2008 (JP) .................. 2008-005548 U

(51) Int. Cl.
*G02C 5/00* (2006.01)
(52) U.S. Cl. .................. 351/41; 351/62; 351/103
(58) Field of Classification Search .................. 351/41, 351/44, 62, 103–109, 154
See application file for complete search history.

(56) References Cited

U.S. PATENT DOCUMENTS

| 4,779,291 A | 10/1988 | Russell |
| 4,859,048 A | 8/1989 | Jannard |
| 5,774,201 A | 6/1998 | Tackles |
| 2005/0206841 A1 | 9/2005 | Saderholm et al. |
| 2007/0252944 A1 * | 11/2007 | Welchel et al. ............. 351/62 |
| 2007/0296913 A1 | 12/2007 | Tabacchi |

FOREIGN PATENT DOCUMENTS

JP 1997-197350 7/1997

* cited by examiner

*Primary Examiner*—Huy K Mai
(74) *Attorney, Agent, or Firm*—DLA Piper LLP (US)

(57) ABSTRACT

Eyeglasses configured in such a way that parameter (h) is 20 mm or greater and (l/h) is 6 or smaller, the parameters (h) and (l) being defined as follows: the length of a straight line (L) connecting portions (C) to which left and right temples are attached is (l) mm, and the length of a normal (H) to the straight line (L) drawing from the forefront surface (E) of a front portion (B) located on the central line (D) of the eyeglasses is (h) mm.

19 Claims, 9 Drawing Sheets

A

EYEGLASSES

BACKGROUND OF THE INVENTION

1. Field of the Invention

The present invention relates to an improvement in eyeglasses that provide excellent performance, for example, in protecting the eyes by reducing the amount of ultraviolet light and is shaped to fit on the face of the wearer to improve the sense of wearing eyeglasses.

2. Description of the Related Art

A conventional example of the eyeglasses of this type is shown in FIG. 11 in H09-197350 JPA1. The eyeglasses described in H09-197350 JPA1 are sunglasses and include a flexible, resilient single lens having an appropriate curved surface. A pair of left and right frames 12 are fixed to the upper edges of left and right end portions of the lens 11 with screws, and each of the frames 12 is connected to a temple 13.

The conventional eyeglasses described above provide excellent performance, for example, in protecting the eyes by reducing the amount of ultraviolet light. They also provide excellent performance in vision, that is, provide a wider field of view. They are also shaped to fit on the face of the wearer and hence provide excellent performance in improving the sense of wearing eyeglasses.

In the conventional eyeglasses shaped to fit on the face of the wearer, however, the distance between the face and the eyeglasses is short when the wearer wears the eyeglasses. Therefore, beads of sweat or other liquid objects tend to attach to the inner surface of the lens and degradation in vision occurs accordingly.

Further, the fact that the distance between the face and the eyeglasses decreases likely causes the inner surface of the lens to fog and degradation in vision occurs accordingly.

Moreover, when raindrops attach to the inner and outer surfaces of the lens, degradation in vision tends to occur.

SUMMARY OF THE INVENTION

An object of the present invention is therefore to provide eyeglasses in which a film coated onto a surface of a lens and the shape of the lens prevent degradation in vision due to beads of sweat, raindrops, or other liquid objects that attach to the lens and lens fogging.

The present invention provides single-lens eyeglasses having a single lens or twin-lens eyeglasses having two lenses, wherein parameter (h) is 20 mm or greater and a parameter ratio (l/h) is 6 or smaller, the parameters (h) and (l) being defined as follows: assuming that the eyeglasses are placed on a horizontal surface (A) with temples (T) open so that the eyeglasses are ready to fit on the face of the wearer, and portions C to which the left and right temples (T) are attached are present at both ends of a front portion (B) when the eyeglasses are viewed from above, the length of a straight line (L) connecting the two portions C is (l) mm, and the length of a normal (H) to the straight line (L) drawing from the forefront surface (E) of the front portion (B) located on the central line (D) of the eyeglasses is (h) mm, (K) is 3 degrees or greater, the parameter (K) being defined as follows:

assuming that the eyeglasses are placed on the horizontal surface (A) with the temples (T) open so that the eyeglasses are ready to fit on the face of the wearer, and when the eyeglasses are viewed from the front, a lower portion of each of the left and right halves of the lens or each of the left and right lenses is in contact with the horizontal surface (A) at a single contact point (F) and a circle (G) having a radius of 10 mm around the contact point (F) intersects the lower portion of the lens at an intersection (I), the inclination angle between a straight line (J) connecting the contact point (F) and the intersection (I) and the horizontal surface (A) is (K), and at least the inner surface of the lens or each of the lenses has a water-repellent film or an anti-fogging film.

In the eyeglasses of the present invention,
(h) is 30 mm or greater,
(l/h) is 5 or smaller and
(K) is 5 degrees or greater.

In the eyeglasses of the present invention,
when the portion (C) to which each of the temples (T) is attached is provided at multiple locations in upper and lower portions on each side, the length of a straight line (L) connecting uppermost portions (M) is (l) mm.

In the eyeglasses of the present invention,
the structure of the eyeglasses has no frame in the lower portion of the lens or each of the lenses.

In the eyeglasses of the present invention,
the structure of the eyeglasses allows the lens or lenses to be exchanged.

In the eyeglasses of the present invention,
the lens or each of the lenses is made of plastic, and
the lens or each of the lenses has a hard coat film and/or an anti-reflection film formed thereon.

Since the present invention is implemented as described above, a water-repellent film and an anti-fogging film coated on a surface of the lens can prevent beads of sweat and raindrops from attaching to the lens and fogging from occurring, and the shape of a lower portion of the lens can cause the water droplets attached to the lens to effectively fall, whereby the influence on the vision can be reduced.

DETAILED DESCRIPTION OF THE PREFERRED EMBODIMENTS

Figure 1:
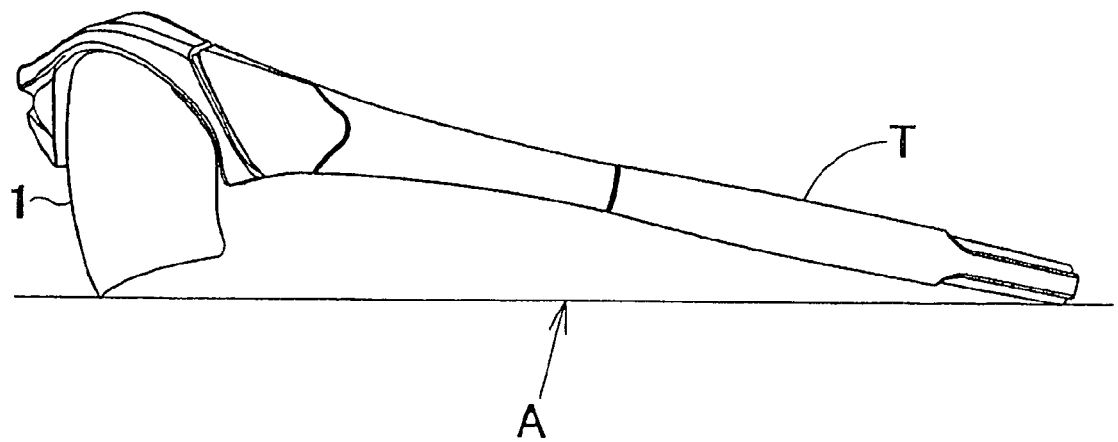
FIG. 1 is a side view of eyeglasses according to the present invention placed on a horizontal surface with temples open and ready to be worn on the face of a wearer.
Figure 2:
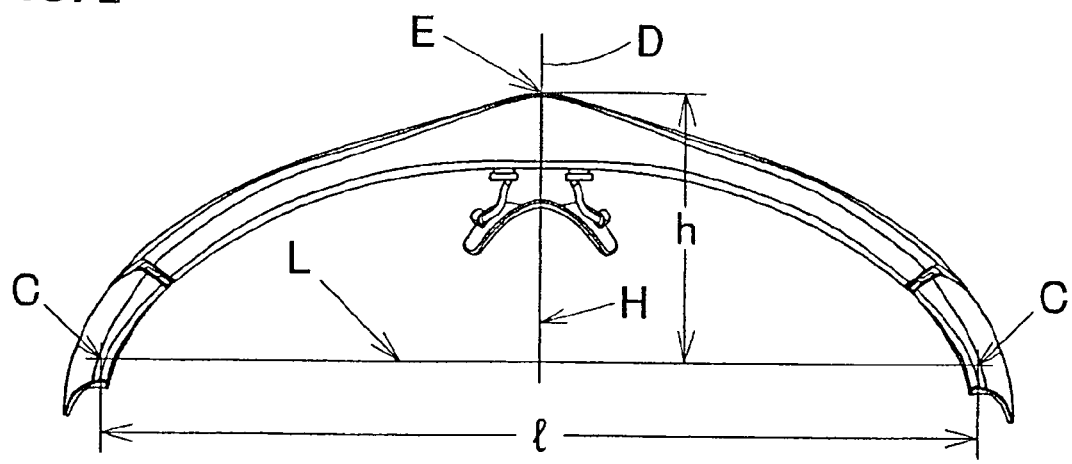
FIG. 2 is a plan view only showing a front portion of the eyeglasses according to the present invention viewed from above and placed on the horizontal surface with the temples open and ready to be worn on the face of a wearer.

The best mode for carrying out the present invention will be described below in detail with reference to the FIGS. 1 to 10 in the drawings.

Figure 5:
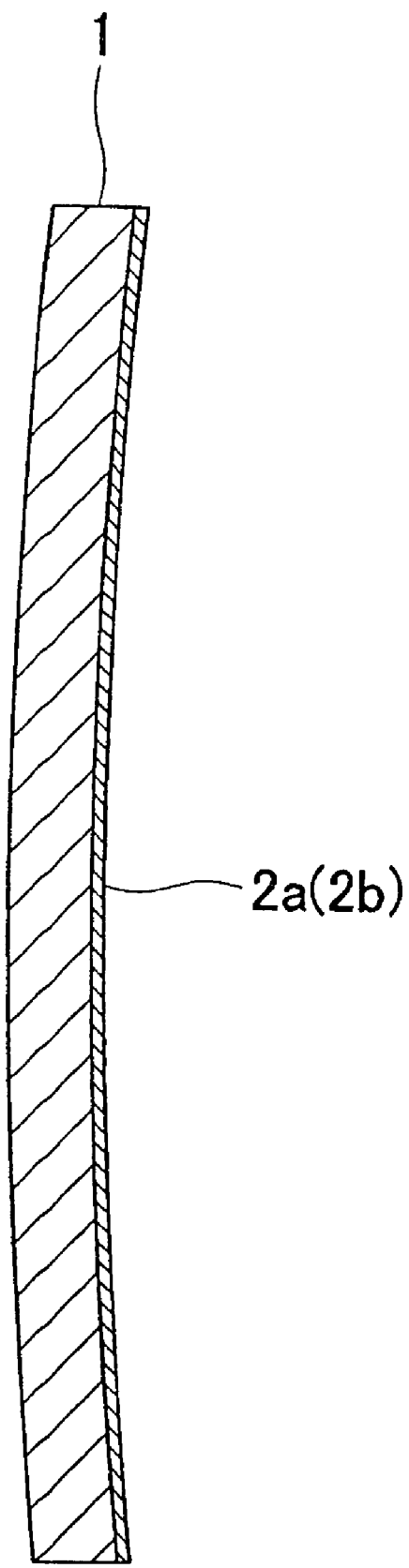
FIG. 5 is a cross-sectional of the lens of the eyeglasses according to the present invention with a water-repellent film or an anti-fogging film coated on the inner surface of the lens.
Figure 6:
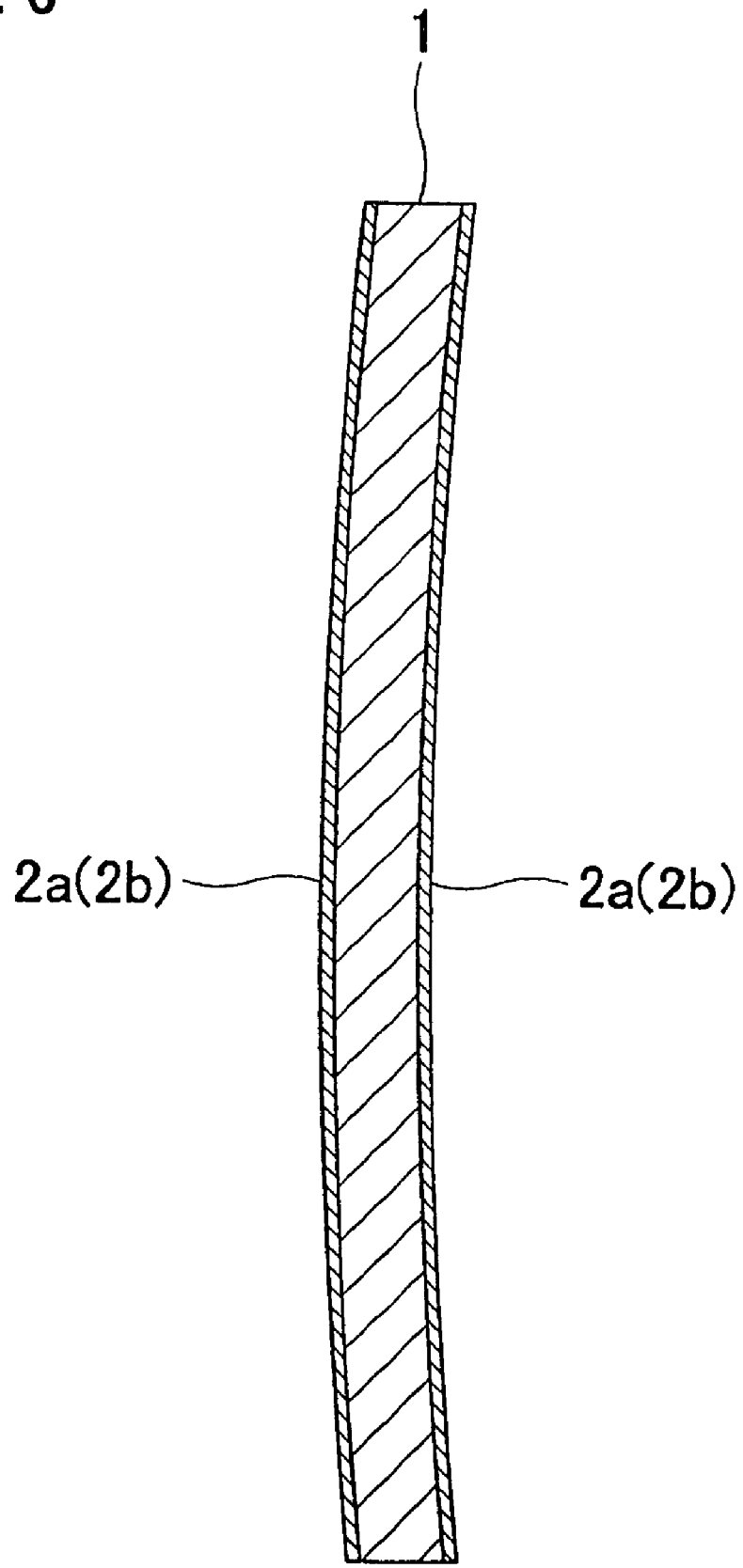
FIG. 6 is a cross-sectional of the lens of the eyeglasses according to the present invention with a water-repellent film or an anti-fogging film coated on each of the inner and outer surfaces of the lens.
Figure 7:
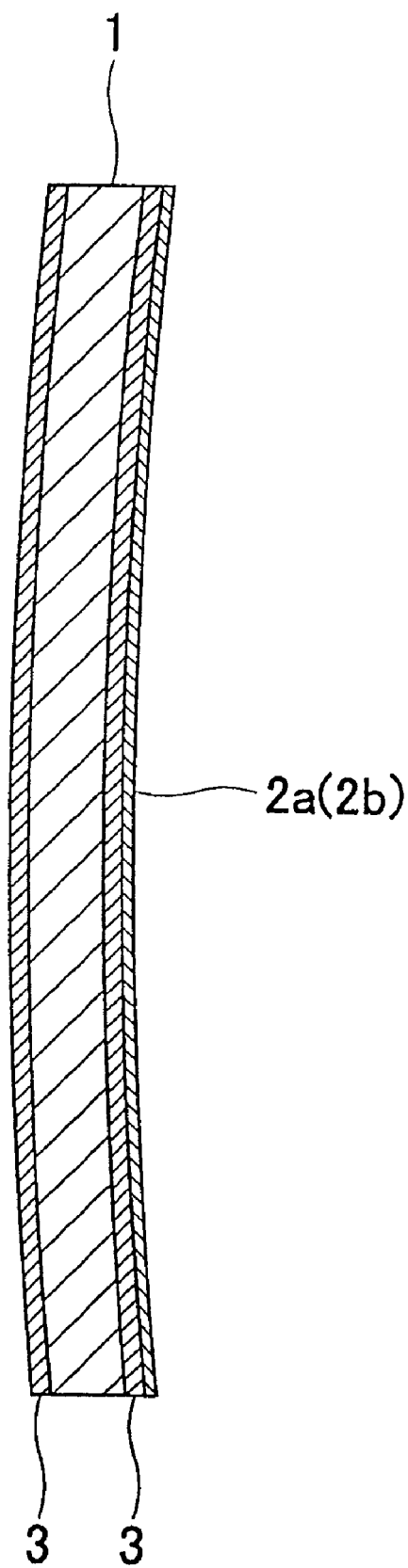
FIG. 7 is a cross-sectional of the lens of the eyeglasses according to the present invention with a water-repellent film or an anti-fogging film coated on the inner surface of the lens having hard coat films formed thereon.
Figure 8:
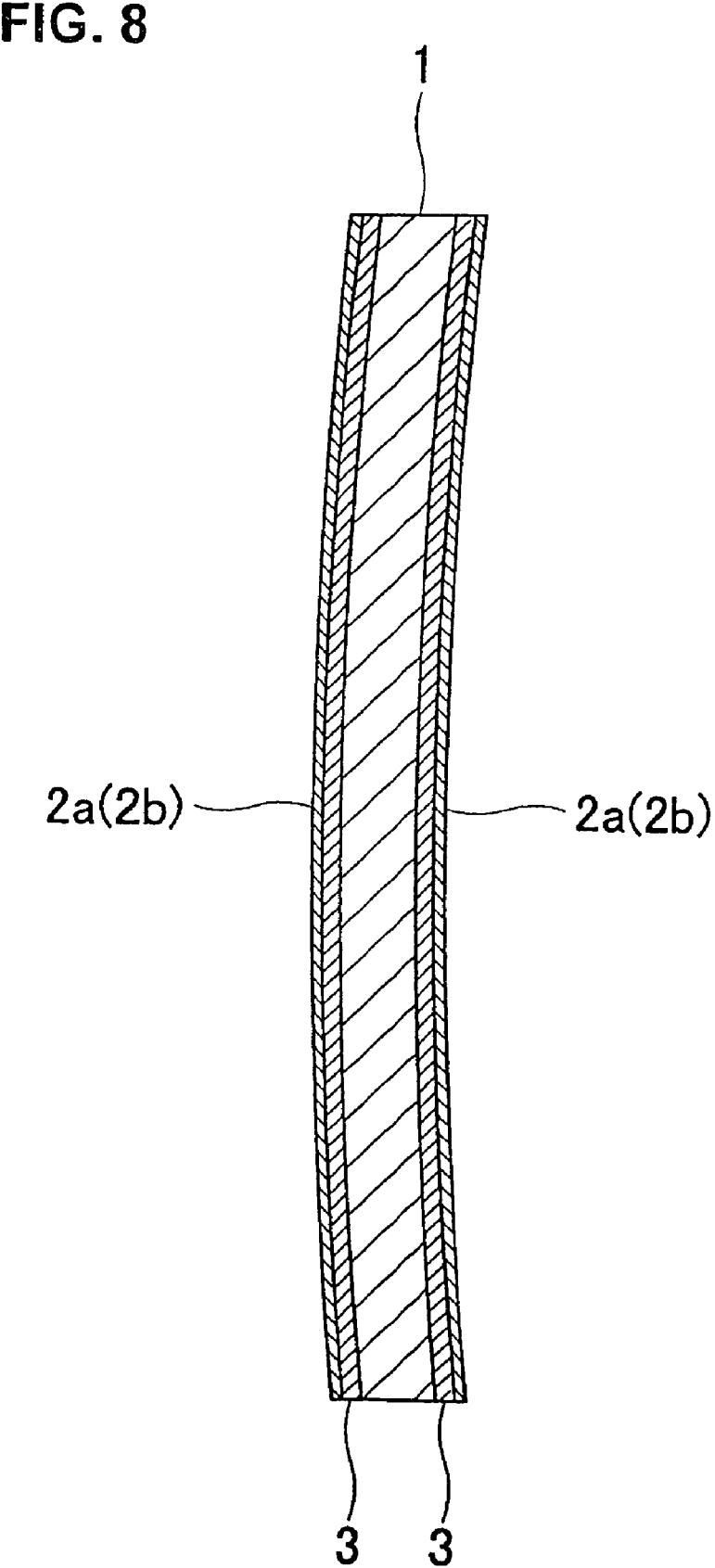
FIG. 8 is a cross-sectional of the lens of the eyeglasses according to the present invention with a water-repellent film or an anti-fogging film coated on each of the inner and outer surfaces of the lens having hard coat films formed thereon.

As shown in FIGS. 5 and 6, the eyeglasses according to the present invention has a water-repellent film 2a coated at least on the inner surface of a lens 1, whereby beads of sweat, raindrops, or other water droplets will not attach to the lens 1 but fall toward a lower portion of the lens 1. Also, as is shown in FIGS. 5 and 6, the eyeglasses according to the present invention alternatively has an anti-fogging film 2b coated at least on the inner surface of the lens 1, whereby the lens 1 will not fog.

In the present invention, the anti-fogging film 2b typically has a certain degree of anti-fogging capacity. When the capacity is not enough, fogging produces water droplets. However, even when the capacity of the anti-fogging performance of the anti-fogging film 2b is not enough to prevent water droplets from being produced, the hydrophilic nature of the anti-fogging film 2b encourages produced water droplets to fall toward a lower portion of the lens 1.

The beads of sweat, raindrops, or other water droplets having reached the lower portion of the lens 1 do not tend to fall from the lens 1 unless they grow to a certain size because of high surface tension. Therefore, the water droplets tend to stay at the lower portion of the lens 1, resulting in degradation in vision.

Figure 3:
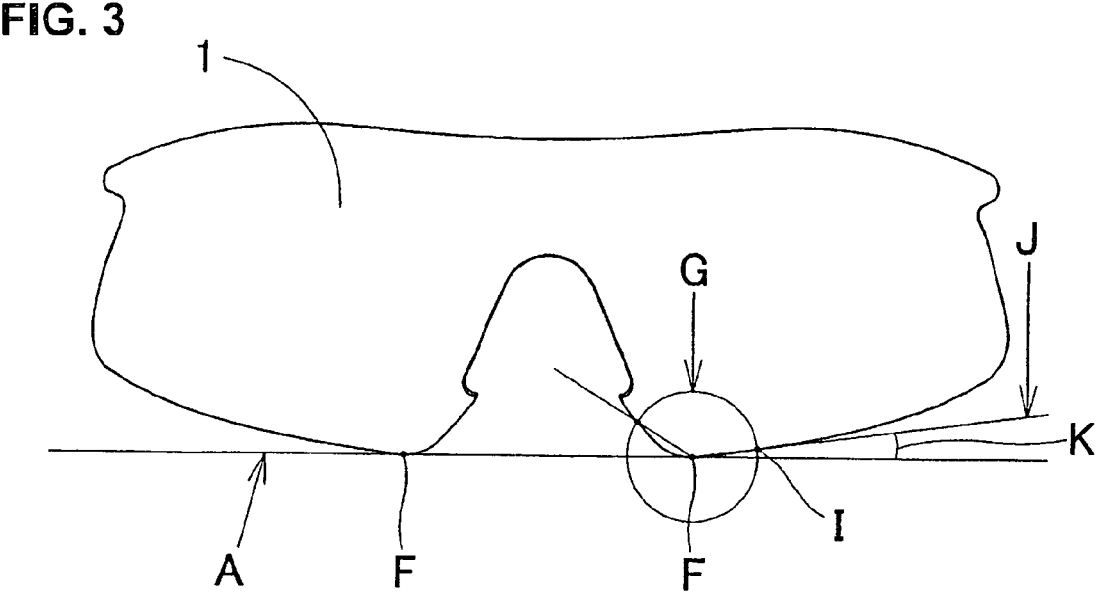
FIG. 3 is a front view only showing a lens of the eyeglasses according to the present invention viewed from the front and placed on the horizontal surface with the temples open and ready to be worn on the face of a wearer.

To address the problem, in the present invention as shown in FIG. 3, an inclined portion having at least a certain amount of inclination is provided at the lower portion of the lens 1, and the beads of sweat; raindrops, or other water droplets having reached the lower portion of the lens 1 are forced to follow the inclined portion, quickly collected in the lowest position of the lower portion of the lens 1, and encouraged to fall. The degradation in vision is thus reduced.

The eyeglasses of the present invention may have a form of single-lens eyeglasses having a single lens 1, twin-lens eyeglasses having two lenses 1, or single-lens eyeglasses having the function and shape of a twin-lens 1.

Figure 4:
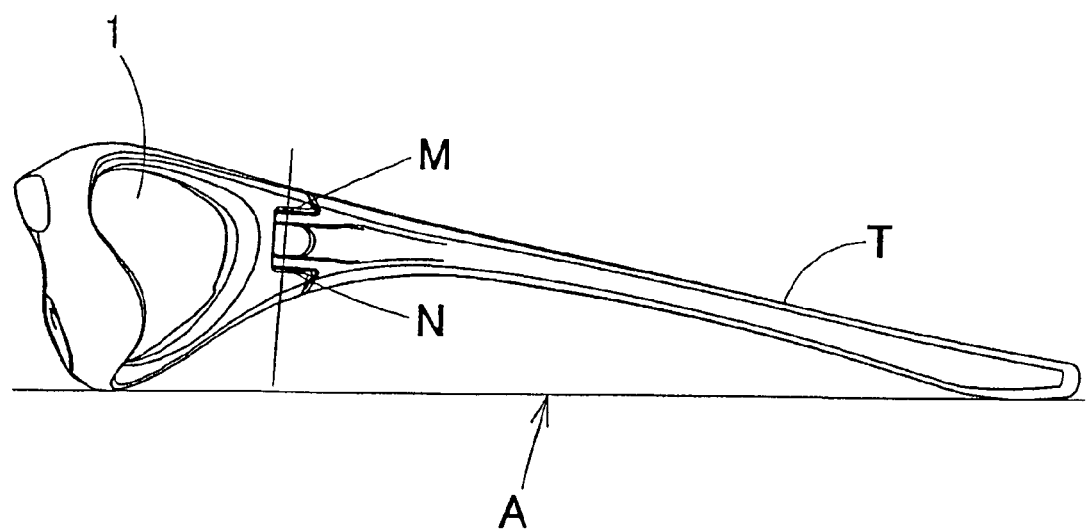
FIG. 4 is a side view of the eyeglasses according to the present invention with the temples attached at multiple locations in upper and lower portions.

Further, in the present invention, each of the single-lens eyeglasses, the twin-lens eyeglasses, and the single-lens eyeglasses having the function and shape of a twin-lens described above has any of the following eyeglass structures shown in FIGS. 1 and 4: an eyeglass structure in which a frame is present at the upper and lower portions on each side of the lens 1, an eyeglass structure in which no frame is present at the upper or lower portion on each side of the lens 1, an eyeglass structure in which a frame is present only at the upper portion on each side of the lens 1, and an eyeglass structure in which a frame is present only at the lower portion on each side of the lens 1. In particular, an eyeglass structure shown in FIG. 1 in which no frame is present at the lower portion on each side of the lens 1 is preferred in order to encourage the water droplets to fall.

Further, in the present invention, each of the single-lens eyeglasses, the twin-lens eyeglasses, and the single-lens eyeglasses having the function and shape of a twin-lens described above may have an eyeglass structure in which the lens or lenses can be exchangeable, specifically, a lens exchangeable structure in which a frame is provided at the upper or lower portion on each side of the lens or lenses 1 and the lens or lenses 1 can be exchanged by attaching the lens or lenses 1 to the frame, or a lens exchangeable structure in which a frame is provided at the upper and lower portions on each side of the lens or lenses 1 and the lens or lenses 1 can be exchanged by sliding the lens or lenses 1 inward through the left and right side portions of a front portion B.

In the present invention, the lens 1 is preferably made of glass or plastic, and a polycarbonate- or nylon-based plastic is particularly preferred in consideration of the toughness of the lens 1.

In the present invention as shown in FIGS. 7 to 10, each of the surfaces of the lens 1 desirably has a hard coat film 3 and/or an anti-reflection film 4, and at least the inner surface of the lens 1 desirably has the water-repellent film 2a or the anti-fogging film 2b.

Further, in the present invention, both the inner and outer surfaces of the lens 1 desirably have the water-repellent film 2a or the anti-fogging film 2b in order to prevent raindrops from attaching to the inner and outer surfaces of the lens 1.

Figure 9:
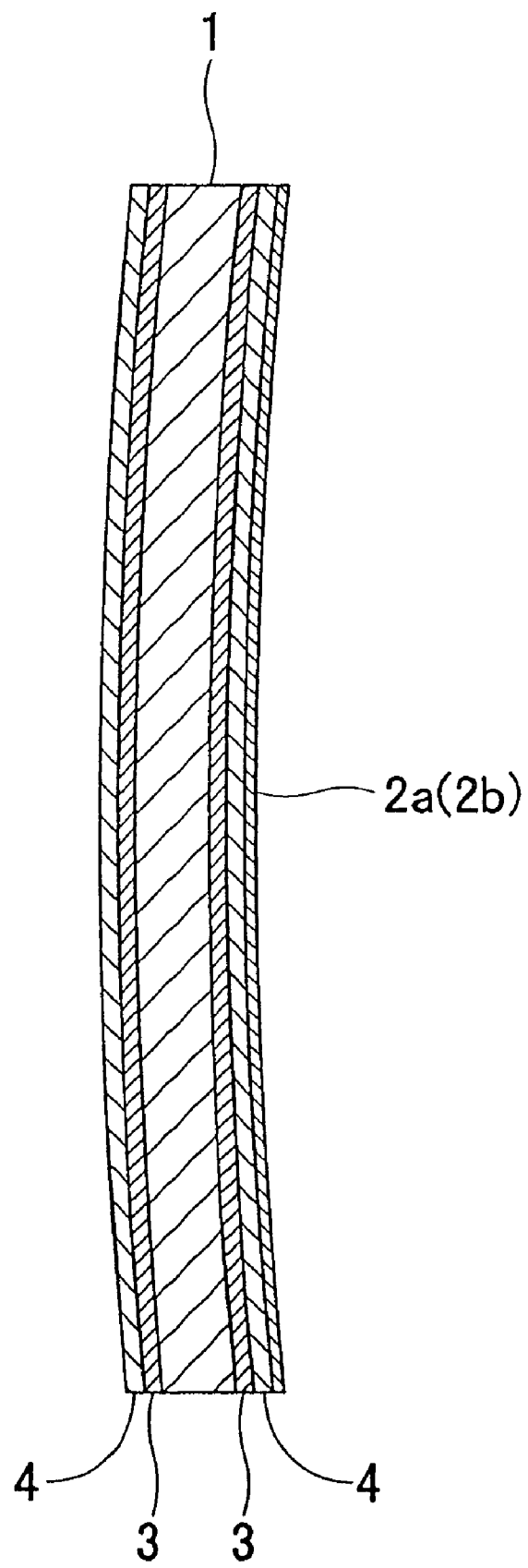
FIG. 9 is a cross-sectional of the lens of the eyeglasses according to the present invention with a water-repellent film or an anti-fogging film coated on the inner surface of the lens having hard coat films and anti-reflection films formed thereon.
Figure 10:
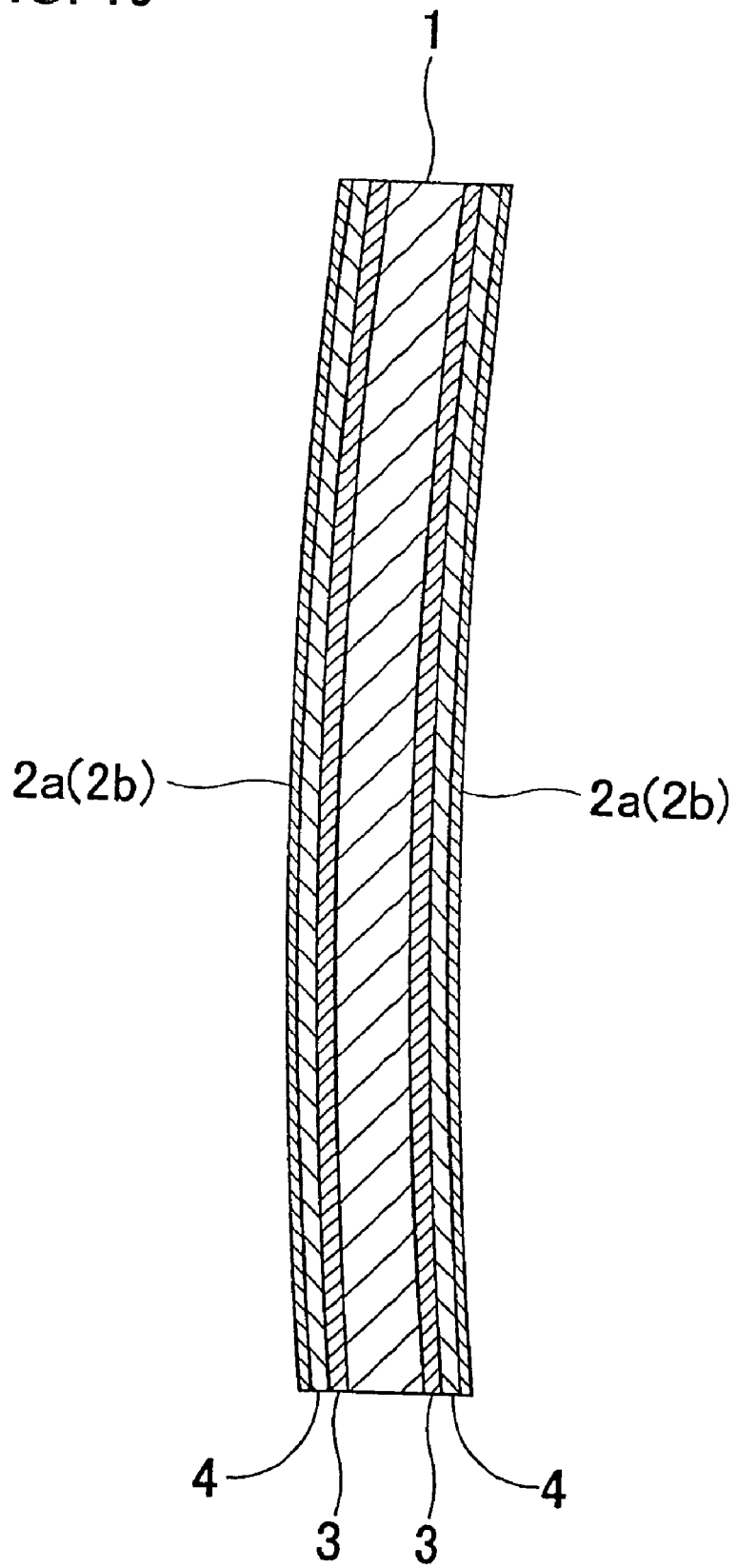
FIG. 10 is a cross-sectional of the lens of the eyeglasses according to the present invention with a water-repellent film or an anti-fogging film coated on each of the inner and outer surfaces of the lens having hard coat films and anti-reflection films formed thereon.
Figure 11:
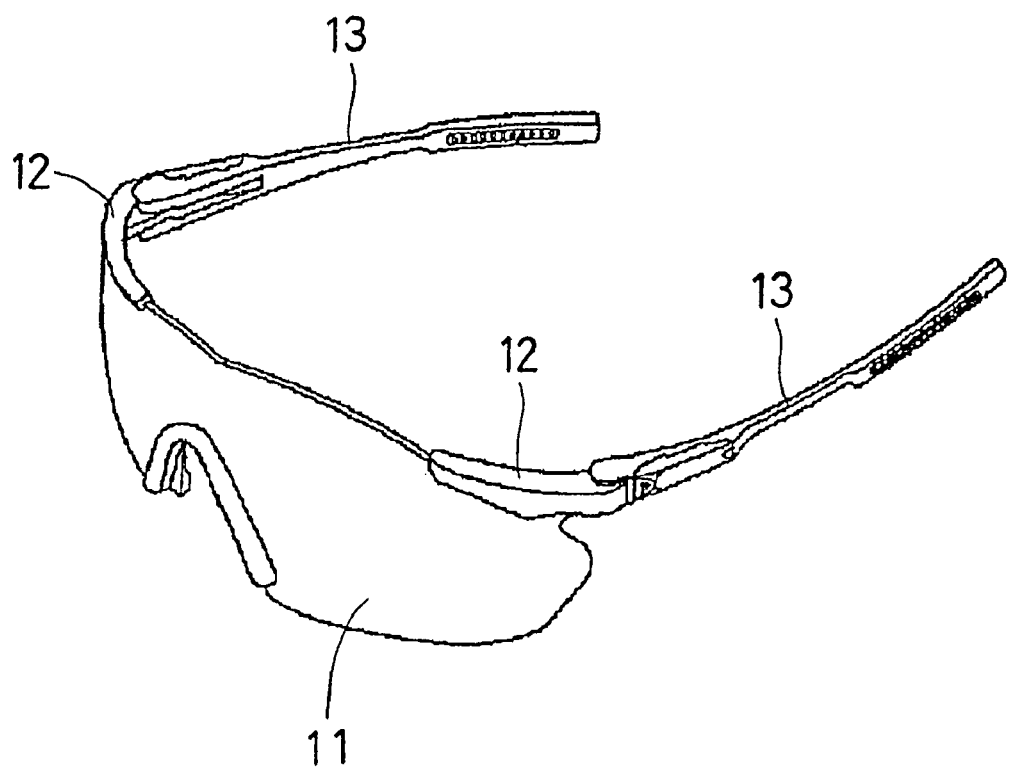
FIG. 11 is a perspective view showing an example of conventional eyeglasses.

In this case, in the present invention as is further shown in FIGS. 9 and 10, the lens 1 is preferably configured as follows: each of the inner and outer surfaces of the lens 1 has the hard coat film 3; the surface of each of the inner and outer hard coat films 3 has the anti-refection film 4; and the surface of each of the inner and outer anti-reflection films 4 has the water-repellent film 2a or the anti-fogging film 2b.

In the present invention as shown in FIGS. 1 to 4, to shape the eyeglasses to fit on the face of the wearer, the curvature of the front portion B along the face needs to be at least a certain value. To this end, h is 20 mm or greater and l/h is 6 or smaller, the parameters (h) and l being defined as follows: Assuming that the eyeglasses are placed on a horizontal surface A with temples T open so that the eyeglasses are ready to fit on the face of the wearer, and portions C to which the left and right temples T are attached are present at both ends of the front portion B when the eyeglasses are viewed from above, the length of a straight line L connecting the t*o portions C is l mm, and the length of a normal H to the straight line L drawing from the forefront surface E of the front portion B located on the central line D of the eyeglasses is h mm. To shape the eyeglasses to fit on the face of the wearer more comfortably, the length h is preferably 30 mm or greater, and l/h is preferably 5 or smaller.

Further, in the present invention as shown in FIGS. 3 and 4, when the portion C to which each of the temples T is attached is provided at multiple locations in upper and lower portions on each side, for example, when the temple is attached to an uppermost portion M and a lowermost portion N, the length of a straight line L connecting the uppermost portions M is l mm.

In the present invention as shown in FIG. 3, the lower portion of the lens 1 is shaped in such a way that an inclined portion is provided at the lower portion of the lens 1, arid the water droplets having reached the lower portion of the lens 1 are forced to follow the inclined portion, quickly collected in the lowest position of the lower portion of the lens 1, and encouraged to fall. To this end, K is 3 degrees or greater, the parameter K being defined as follows: Assuming that the eyeglasses are placed on the horizontal surface A with the temples T open so that the eyeglasses are ready to fit on the face of the wearer, and when the eyeglasses are viewed from the front, the lower portion of each of the left and right halves of the lens or each of the left and right lenses is in contact with the horizontal surface A at a single contact point F and a circle G having a radius of 10 mm around the contact point F intersects the lower portion of the lens at an intersection I, the inclination angle between a straight line J connecting the contact point F and the intersection I and the horizontal surface A is K. The inclination angle K is preferably 5 degrees or greater in order to force the water droplets having reached the lower portion of the lens 1 to follow the inclined portion of the lower portion of the lens 1, be more quickly collected in the lowest position, and be encouraged to fall.

What is claimed is:

1. Single-lens eyeglasses having a single lens or twin-lens eyeglasses having two lenses,
    wherein parameter (h) is 20 mm or greater and a parameter ratio (l/h) is 6 or smaller,
    the parameters (h) and (l) being defined as follows: assuming that the eyeglasses are placed on a horizontal surface (A) with temples (T) open so that the eyeglasses are ready to fit on the face of the wearer, and portions C to which the left and right temples (T) are attached are present at both ends of a front portion (B) when the eyeglasses are viewed from above, the length of a straight line (L) connecting the two portions C is (l) mm, and the length of a normal (H) to the straight line (L) drawing from the forefront surface (E) of the front portion (B) located on the central line (D) of the eyeglasses is (h) mm,
    (K) is 3 degrees or greater,
    the parameter (K) being defined as follows:
    assuming that the eyeglasses are placed on the horizontal surface (A) with the temples (T) open so that the eyeglasses are ready to fit on the face of the wearer, and when the eyeglasses are viewed from the front, a lower portion of each of the left and right halves of the lens or each of the left and right lenses is in contact with the horizontal surface (A) at a single contact point (F) and a circle (G) having a radius of 10 mm around the contact point (F) intersects the lower portion of the lens at an intersection (I), the inclination angle between a straight line (J) connecting the contact point (F) and the intersection (I) and the horizontal surface (A) is (K), and
    at least the inner surface of the lens or each of the lenses has a water-repellent film or an anti-fogging film.

2. The eyeglasses according to claim 1,
    wherein (h) is 30 mm or greater,
    (l/h) is 5 or smaller and
    (K) is 5 degrees or greater.

3. The eyeglasses according to claim 2,
    wherein when the portion (C) to which each of the temples (T) is attached is provided at multiple locations in upper and lower portions on each side, the length of a straight line (L) connecting uppermost portions (M) is l mm.

4. The eyeglasses according to claim 3,
    wherein the structure of the eyeglasses has no frame in the lower portion of the lens or each of the lenses.

5. The eyeglasses according to claim 4,
    wherein the structure of the eyeglasses allows the lens or lenses to be exchanged.

6. The eyeglasses according to claim 3,
    wherein the structure of the eyeglasses allows the lens or lenses to be exchanged.

7. The eyeglasses according to claim 2,
    wherein the structure of the eyeglasses has no frame in the lower portion of the lens or each of the lenses.

8. The eyeglasses according to claim 7,
    wherein the structure of the eyeglasses allows the lens or lenses to be exchanged.

9. The eyeglasses according to claim 2,
    wherein the structure of the eyeglasses allows the lens or lenses to be exchanged.

10. The eyeglasses according to claim 1,
    wherein when the portion (C) to which each of the temples (T) is attached is provided at multiple locations in upper and lower portions on each side, the length of a straight line (L) connecting uppermost portions (M) is l mm.

11. The eyeglasses according to claim 10,
    wherein the structure of the eyeglasses has no frame in the lower portion of the lens or each of the lenses.

12. The eyeglasses according to claim 11,
    wherein the structure of the eyeglasses allows the lens or lenses to be exchanged.

13. The eyeglasses according to claim 10,
    wherein the structure of the eyeglasses allows the lens or lenses to be exchanged.

14. The eyeglasses according to claim 1,
    wherein the structure of the eyeglasses has no frame in the lower portion of the lens or each of the lenses.

15. The eyeglasses according to claim 14,
    wherein the structure of the eyeglasses allows the lens or lenses to be exchanged.

16. The eyeglasses according to claim 1,
    wherein the structure of the eyeglasses allows the lens or lenses to be exchanged.

17. The eyeglasses according to claim 1,
    wherein the lens or each of the lenses is made of plastic, and the lens or each of the lenses has a hard coat film formed thereon.

18. The eyeglasses according to claim 1,
    wherein the lens or each of the lenses is made of plastic, and the lens or each of the lenses has an anti-reflection film formed thereon.

19. The eyeglasses according to claim 1,
    wherein the lens or each of the lenses is made of plastic, and the lens or each of the lenses has a hard coat film and an anti-reflection film formed thereon.

* * * * *